(12) United States Patent  
Karasawa (10) Patent No.: US 7,172,293 B2  
(45) Date of Patent: Feb. 6, 2007

(54) PROJECTOR

(75) Inventor: Joji Karasawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/805,241

(22) Filed: Mar. 22, 2004

(65) Prior Publication Data

US 2004/0212782 A1  Oct. 28, 2004

(30) Foreign Application Priority Data

Mar. 24, 2003 (JP) .............................. 2003-080718

(51) Int. Cl.
G03B 21/14 (2006.01)
(52) U.S. Cl. ................................ 353/79; 353/20; 349/5
(58) Field of Classification Search ............... 353/20, 353/74, 75, 79, 122; 359/454, 455, 456, 359/457, 458, 460; 349/5, 7, 15, 18, 87, 349/96

See application file for complete search history.

(56) References Cited

U.S. PATENT DOCUMENTS

| 5,048,949 | A |   | 9/1991  | Sato et al. |        |
|-----------|---|---|---------|-------------|--------|
| 5,097,323 | A |   | 3/1992  | Sato et al. |        |
| 5,162,897 | A | * | 11/1992 | Jitsukata et al. | 348/58 |
| 5,442,484 | A |   | 8/1995  | Shikawa |        |
| 5,506,642 | A | * | 4/1996  | Suzuki et al. | 353/74 |
| 5,671,993 | A | * | 9/1997  | Shikama | 353/77 |
| 6,064,521 | A | * | 5/2000  | Burke | 359/443 |
| 6,220,713 | B1 | * | 4/2001  | Tadic-Galeb et al. | 353/77 |
| 6,561,649 | B1 | * | 5/2003  | Burstyn | 353/8 |
| 6,715,879 | B2 | * | 4/2004  | De Vaan | 353/20 |
| 6,829,110 | B2 | * | 12/2004 | Watanabe | 359/822 |
| 6,853,493 | B2 | * | 2/2005  | Kreitzer | 359/651 |

FOREIGN PATENT DOCUMENTS

| EP | 1 098 209 A1 | 5/2001 |
| JP | A 5-5950 | 1/1993 |
| JP | A 05-066482 | 3/1993 |
| JP | A 9-218379 | 8/1997 |
| JP | A 10-260474 | 9/1998 |
| JP | A 2000-10188 | 1/2000 |
| JP | A 2000-10188 | 11/2000 |
| JP | A 2001-255462 | 9/2001 |
| JP | A 2002-107663 | 4/2002 |
| KR | 1020020004406 A | 1/2002 |

* cited by examiner

Primary Examiner—William C. Dowling  
(74) Attorney, Agent, or Firm—Oliff & Berridge, PLC (57) ABSTRACT

To provide a thin projector, such as a rear projector, formed by a less expensive projection optical system which is easy to assemble and install, and performing a highly accurate projection, projection light PL projected with a projection optical system onto a screen is linearly polarized light having a polarization azimuth along the longitudinal direction of the screen. With this arrangement, the right and left ends of the rear surface of the screen maintain a low reflectance, thereby reducing a loss in quantity of illumination light when passing through the screen, in other words, achieving high luminance of an image projected onto the screen while maintaining its uniformity of brightness.

6 Claims, 8 Drawing Sheets

PROJECTOR

BACKGROUND OF THE INVENTION

1. Field of Invention

The present invention relates to a projector projecting an image by using spatial light modulation devices, such as liquid crystal panels.

2. Description of Related Art

Among related art rear projection projectors, a shallow rear projector is prevailing, in which image light emitted from a projection optical system disposed behind and at the lower part of a screen is eventually reflected toward the forward direction, while being reflected at at least one plane mirror to secure a light path, so as to be projected onto the screen See Japanese Unexamined Patent Application Publication No. 5-66482.

A projection display apparatus in which a diagonal projection having a large magnification is possible by forming its projection optical system with a plurality of concave and convex mirrors having different optical axes from each other has been proposed. See Japanese Unexamined Patent Application Publication No. 2001-255462. The projection display apparatus has a thin structure by achieving a high magnification and a diagonal projection.

SUMMARY OF THE INVENTION

According to the former method using the plane mirror, although the rear projector has a relatively thin structure, distortion occurs and the projector becomes taller. Also, not only the relatively large plane mirror makes the projector heavier but also the plane mirror incorporated in an actual projector, requires a special mechanism to adjust displacements of the projection optical system and the plane mirror, thereby increasing an adjusting step and resultantly a cost of the projector.

Also, according to the latter method, using the projection optical system formed by a plurality of concave and convex mirrors, although the projection display apparatus can project a relatively highly accurate image while maintaining a thin structure, and adjusting work in the case of incorporating a plane mirror can be eliminated, the projection optical system itself is hard to assemble and adjust, thereby resulting in an increased cost of the projection display apparatus.

In view of the above problems, the present invention provides a thin projector (projection apparatus), such as a rear projector, formed by a less expensive projection optical system which is easy to assemble and install, and performs highly accurate projection.

In order to address the above problems, a projector according to an aspect of the present invention includes an illumination device to emit illumination light; spatial light modulation devices illuminated with illumination light emitted from the illumination device; a projection optical system to project image light emitted from the spatial light modulation devices; a flat and rectangular screen onto which the image light passing through the projection optical system is projected; and a polarizing device to make the image light emitted from the spatial light modulation devices incident on the screen so as to serve as linearly polarized light having a polarization azimuth along a predetermined direction except for the lateral direction of the screen. Here, the term "spatial light modulation device" refers to an optical device represented by, for example, a liquid-crystal light valve, and has an embodiment including a digital mirror device.

In this projector, since the polarizing device makes the image light, emitted from the spatial light modulation devices, incident on the screen, so as to serve as linearly polarized light having a polarization azimuth along a predetermined direction, except for the lateral direction of the screen, the longitudinal both ends of the screen can also maintain a low reflectance, thereby reducing a loss in quantity of image light when passing through the screen. Accordingly, even when this structure is applied to, for example, a thin rear projection type projector having a large projection magnification, high luminance of an image can be achieved while maintaining the uniformity of brightness across the entire screen.

In a specific modification of the projector, the polarizing device makes the image light emitted from the spatial light modulation devices incident on the screen so as to serve as linearly polarized light having a polarization azimuth along the longitudinal direction of the screen. In this case, a loss in quantity of illumination light incident on the longitudinal both ends of the screen can be minimized, thereby providing a projector exhibiting relatively less unevenness of brightness as a whole.

Also, in a specific variation of the projector, the screen is a rear projection screen including a Fresnel lens portion disposed at the incident side thereof and a diffusing screen portion, such as a lenticular lens, disposed at the exit side thereof. Meanwhile, The Fresnel lens portion has a flat incident surface. In this case, a reflection loss of both ends of the flat incident surface having a large incident angle from the projection optical system to the flat incident surface of the Fresnel lens can be reduced.

In addition, in another specific variation of the projector, the polarizing device includes polarization filters disposed at the exit sides of the corresponding spatial light modulation devices. In this case, the projector has a simple structure having only the polarization filters disposed at the exit sides of the spatial light modulation devices. When the spatial light modulation devices are liquid-crystal light valves, although the polarization filters are disposed at the incident and exit surfaces of each liquid-crystal light valve, the polarization filters at the corresponding exit sides are disposed in corresponding predetermined azimuths so as to serve as the polarizing means. Also each polarization filter at the incident side is disposed such that its azimuth is turned by, for example, 90 degrees with respect to that of the corresponding polarization filter at the exit side.

Furthermore, in another specific variation of the projector, the projection optical system includes an L-shaped optical unit to bend a light path, having a pair of lens groups and reflecting device interposed therebetween. In this case, the projection optical system has a reduced length extending in the optical axis direction on the exit side of the optical unit, and also, optical components, such as the illumination device can be disposed at lateral sides of the optical unit. Thus, a projector or the like having, for example, a rear projection screen housed therein does not require a relatively large reflecting mirror or the like, substantially opposed to the screen to be incorporated in its housing. As a result, a shallow and thin projector can be achieved in spite of the fact that it is light and is easy to assemble and manufacture. Meanwhile, the L-shaped optical unit has a simple structure in which a reflecting device, such as a mirror, is merely incorporated therein while known lens systems being basically used, thereby making an optical design and manufacturing of the projector easy.

Also, another projector according to an aspect of the present invention includes an illumination device to emit illumination light; spatial light modulation devices illuminated with illumination light emitted from the illumination device; a projection optical system which includes an L-shaped optical unit to bend a light path, having a pair of lens groups and a reflecting device interposed therebetween and which projects image light emitted from the spatial light modulation devices via the optical unit; and a screen onto which the image light passing through the projection optical system is projected.

In this projector, since the projection optical system projects image light emitted from the spatial light modulation devices via the L-shaped optical unit to bend a light path, having the pair of lens groups and the reflecting device interposed therebetween, the projection optical system has a reduced length extending in the optical axis direction on the exit side of the optical unit. Also optical components, such as the illumination device, can be disposed at lateral sides of the optical unit. Thus, a shallow and thin projector can be achieved. Meanwhile, an optical design of the L-shaped optical unit is simple.

Also, in a specific variation of the projector, the screen is a rear projection screen, and the optical unit directly focuses the image light emitted from the spatial light modulation devices onto the screen. In this case, since the projector has a structure in which a relatively large reflecting mirror substantially opposed to the screen is not incorporated in the housing thereof, a thin projector can be achieved in spite of the fact that it is light and is easy to assemble and manufacture.

In addition, in another specific variation of the projector, the optical unit has an optical axis bent on a vertically extending plane orthogonal to the screen. In this case, optical components, such as the illumination device can be reliably disposed around an upper part and/or a lower part of a plane orthogonal to the optical axis direction, and also the structure of the optical unit can be simple.

Furthermore, in another specific variation of the projector, the illumination device is disposed such that the optical axis of a lamp serving as a light source to generate illumination light lies horizontally. In this case, an operation of the lamp can be stabilized.

Still furthermore, in another specific variation of the projector, the exit-side optical axis of the projection optical system is perpendicular to a surface of the screen extending along the central part of the screen. In this case, an image projected by the projection optical system onto the screen has less aberration, such as distortion.

Moreover, in another specific variation of the projector, there are provided a color modulation device including the spatial light modulation devices for a plurality of colors, for corresponding colors, each device being illuminated with corresponding illumination light emitted from the illumination device, and a light-separation modulation device which includes a light-synthesizing member to synthesize corresponding kinds of color image light emitted from the color modulation device and which emits the synthesized image light. The projection optical system projects the image light synthesized with the light-synthesizing member onto the screen. In this case, a color image having a highly uniform luminance can be projected by a shallow and thin projector.

DETAILED DESCRIPTION OF EXEMPLARY EMBODIMENTS

The structure of a projector according to an exemplary embodiment of the present invention will be described with reference to the accompanying drawings.

Figure 1:
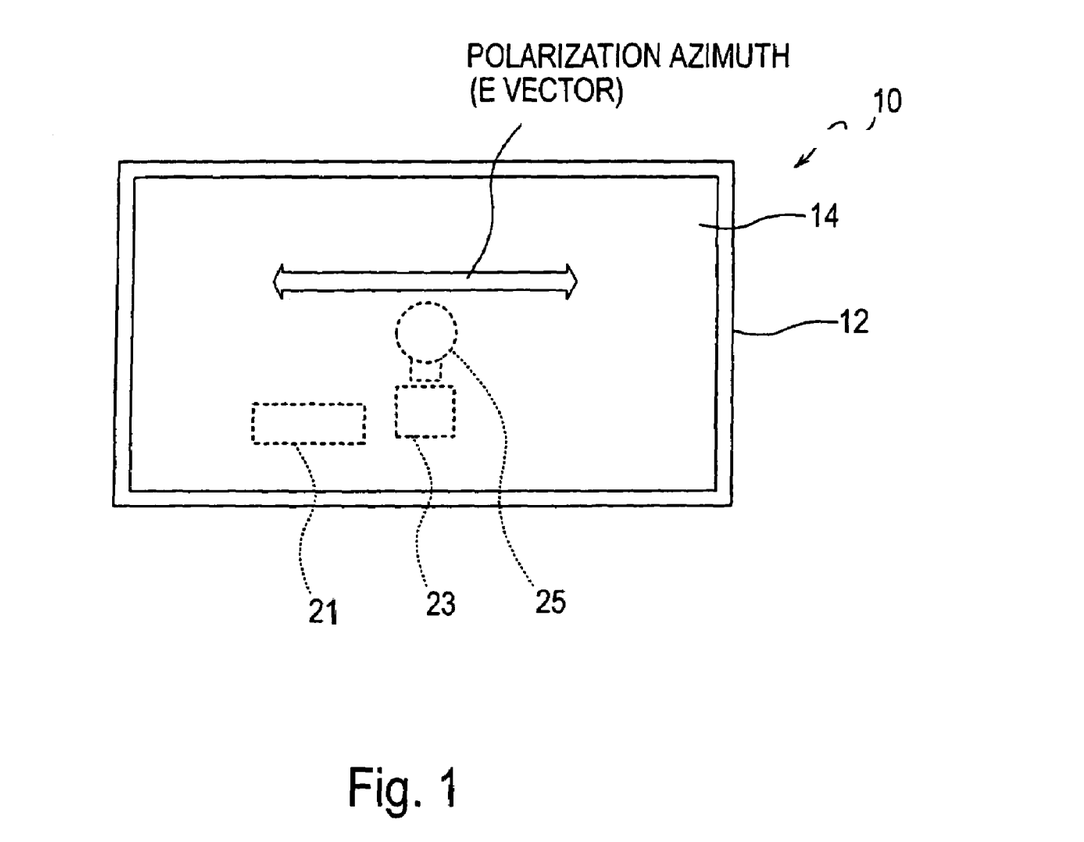
FIG. 1 is a schematic of a projector according to an exemplary embodiment of the present invention.
Figure 2A:
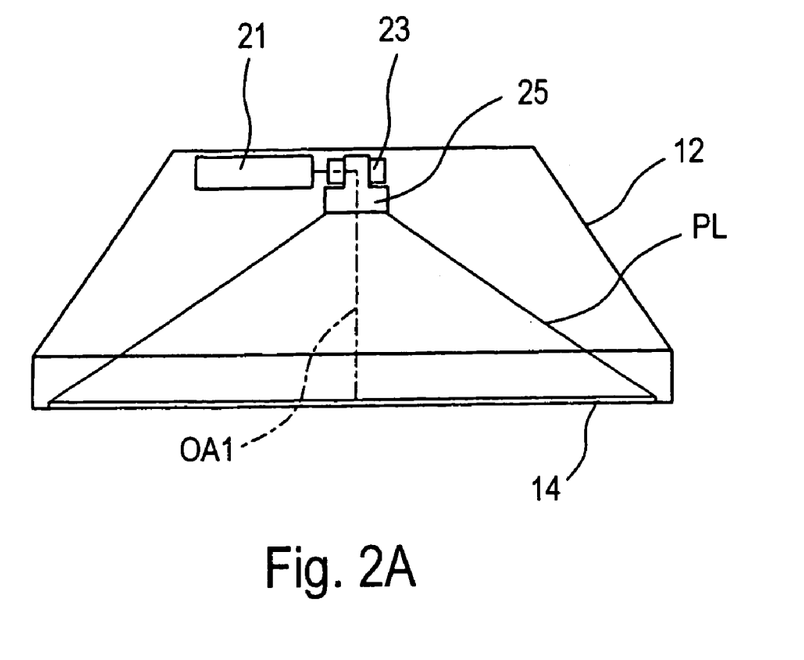
FIGS. 2(a) and 2(b) are schematics of the projector.
Figure 2B:
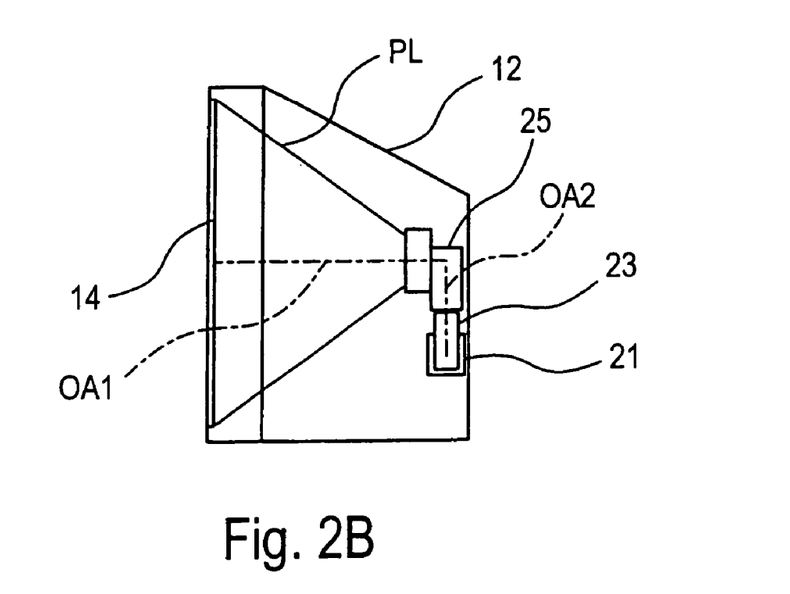

FIG. 1 illustrates the projector according to an exemplary embodiment, that is, an elevation view of the projector, and FIGS. 2(a) and 2(b) are respectively a perspective plan view and a perspective side view of the projector.

A projector 10 has a structure in which a main body formed by an optical system portion, an electrical circuit, and so forth is accommodated and held in a casing 12 serving as a housing.

The casing 12 has a screen 14 fixed across the entire front surface thereof in an embedded state. The screen 14 is a rear projection screen illuminated with projection light emitted from the inside of the casing 12 and has a rectangular shape which has a long width relative to the length. That is, which extends longer in the horizontal direction than in the vertical direction.

Figure 3:
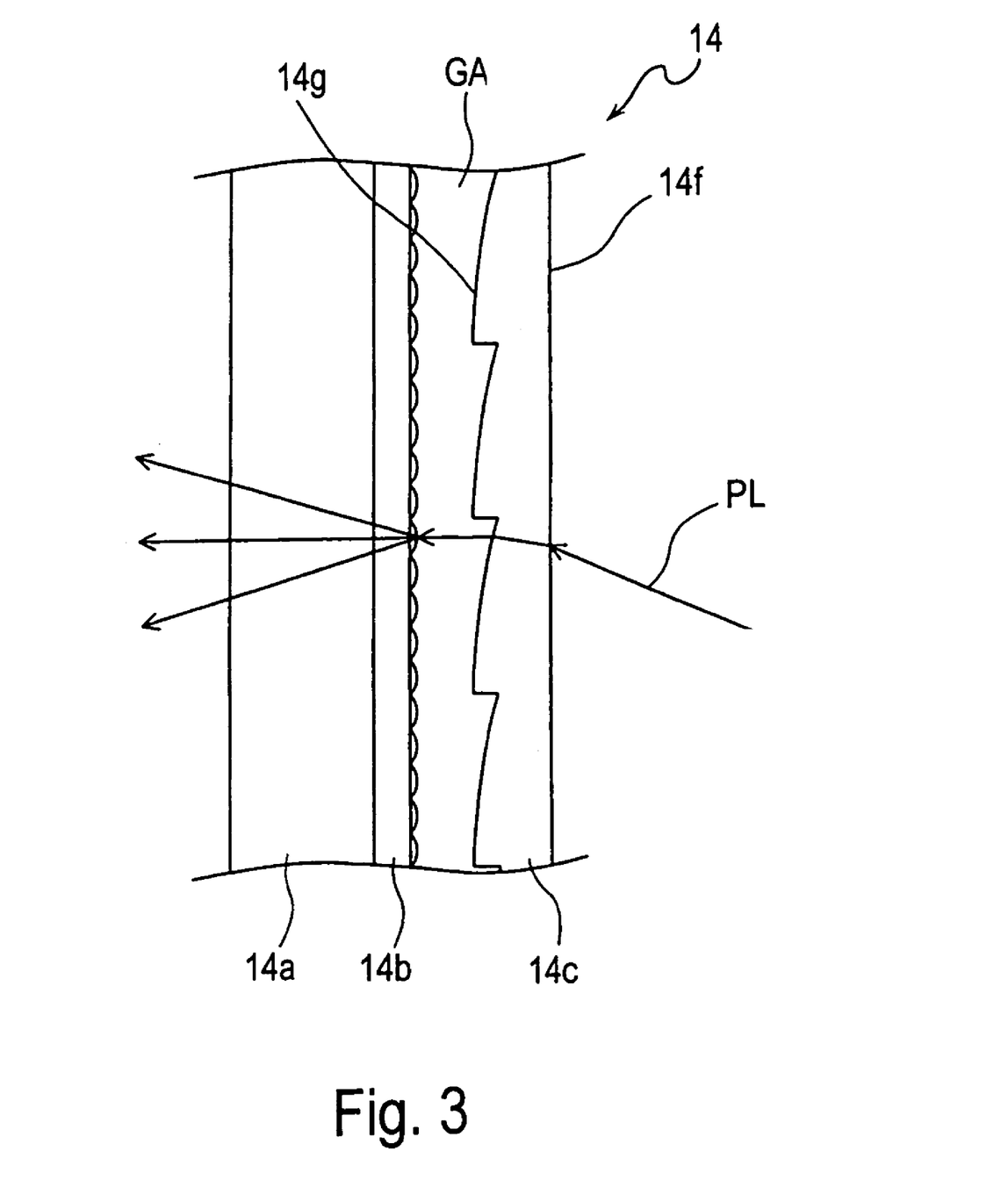
FIG. 3 is a sectional schematic of a screen.

FIG. 3 is an illustration of the sectional structure of the screen 14. The screen 14 has a triple layer structure formed by a transparent substrate 14a, a screen film 14b, and a Fresnel lens 14c laminated in that order. The transparent substrate 14a is made from a transparent parallel plate and has the screen film 14b bonded and closely contacted to the rear surface thereof. The screen film 14b is also referred to as a lenticular screen and has a large number of microlenses formed on the surface thereof opposed to the Fresnel lens 14c. The shape, the size, the arrangement, and the like of the microlenses are appropriately decided taking the use of the projector, the compatibility with other optical systems, and so forth into account.

The Fresnel lens 14c is fixed to the transparent substrate 14a with a fixing member (not shown) in a state in which it is opposed to the screen film 14b, having a gap GA interposed therebetween. The Fresnel lens 14c has a flat surface 14f formed on the incident side thereof and lens protrusions 14g, each having a ring belt shape, formed on the exit side thereof. Projection light PL incident on the rear surface of the Fresnel lens 14c is converted into a flux substantially perpendicular to the screen 14 with the Fresnel lens 14c and is incident on the screen film 14b. The projection light PL incident on the screen film 14b, serving as image light, is scattered at appropriately distributed angles with the screen film 14b and is transmitted through the transparent substrate 14a.

Referring back to FIGS. 1 and 2, behind the screen 14 and in the casing 12, the projector 10 includes an illumination device 21 including a light source to generate illumination light, a color-separation modulation optical-system 23 to form a transmittance distribution corresponding to an image by applying spatial light modulation on illumination light emitted from the illumination device 21 and a projection optical system 25 to project the transmittance distribution formed with the color-separation modulation optical-system 23 onto the screen 14 with an appropriate magnification. An optical system portion including the illumination device 21, the color-separation modulation optical-system 23 and the projection optical system 25 is constructed such that these components are reliably fixed in the casing 12 with respective retaining members (not shown) and that the positional relationship and the like among them can be finely adjusted if needed.

The projection light PL projected with the projection optical system 25 onto the screen 14 is linearly polarized light having a polarization azimuth along the longitudinal direction of the screen 14. With this arrangement, as will be described later, the right and left ends of the rear surface of the screen 14 also maintain a low reflectance, thereby reducing a loss in quantity of projection light when passing through the screen, specifically, achieving high luminance of an image projected onto the screen 14 while maintaining its uniformity of brightness.

Also, an exit-side optical axis OA1 of the projection optical system 25 perpendicularly intersects with the plane of the screen 14 extending along the central part of, that is, the center of the screen 14. With this arrangement, an image projected with the projection optical system 25 onto the screen 14 becomes highly accurate and sharp with less aberration, such as distortion.

Also, the projection optical system 25 is an L-shaped optical unit, and an incident-side optical axis OA2 thereof is perpendicular to the exit-side optical axis OA1 and extends downwards in the vertical direction. Image light emitted from the projection optical system 25 is directly incident on the screen 14 without passing through an optical member, such as a mirror. With this arrangement, the optical system portion, including the illumination device 21 and the color-separation modulation optical-system 23, can be arranged in directions perpendicular to the optical axis OA1 with respect to the projection optical system 25, that is, in a surrounding space extending. For example, downwards and sidewards from the projection optical system 25 but not rearwards from the projection optical system 25. The size of the optical system portion including the illumination device 21, the color-separation modulation optical-system 23 and the projection optical system 25 can be made shorter in the direction along the optical axis OA1, thereby achieving a relatively thin projector without using a plane mirror to secure a light path. Also, since no mirror is needed to be incorporated in the housing, distortion or displacement of an image caused by the mirror inserted in the light path can be reduced or prevented. As a result, a correction mechanism and a correction step against these problems can be eliminated. In addition, since the mirror and a mechanism accompanying the mirror can be eliminated, a shallow and thin projector can be achieved in spite of the fact that it is light and is easy to assemble and manufacture.

Figure 4:
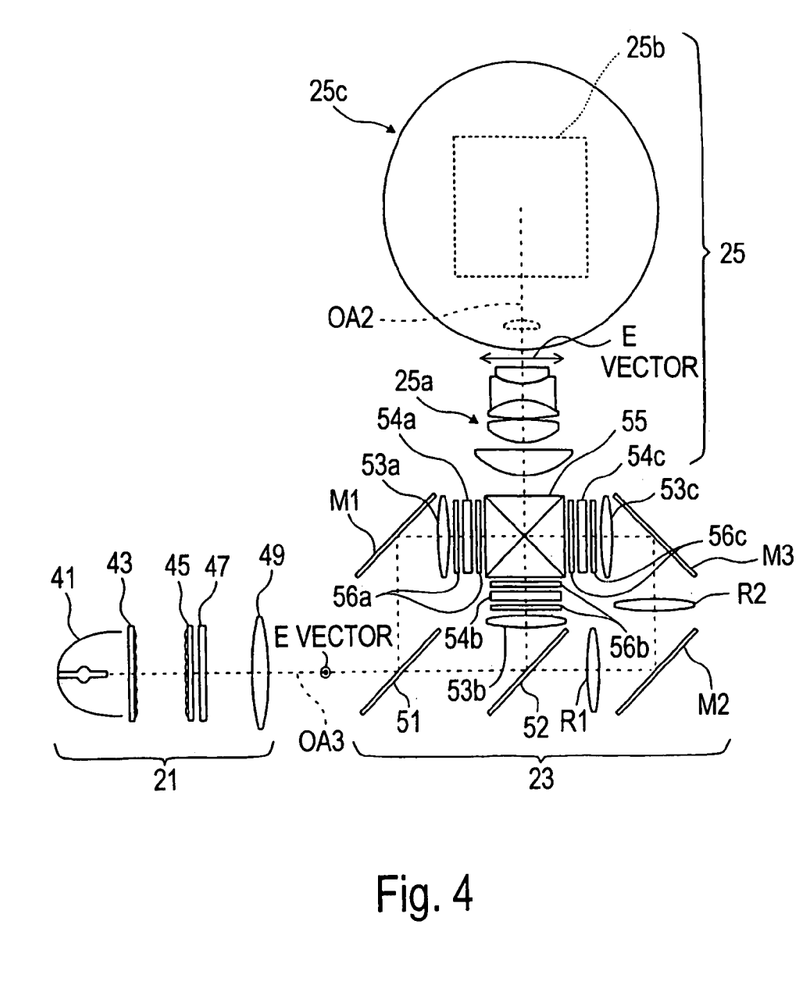
FIG. 4 is a schematic illustrating the structure of an optical system portion.
Figure 5:
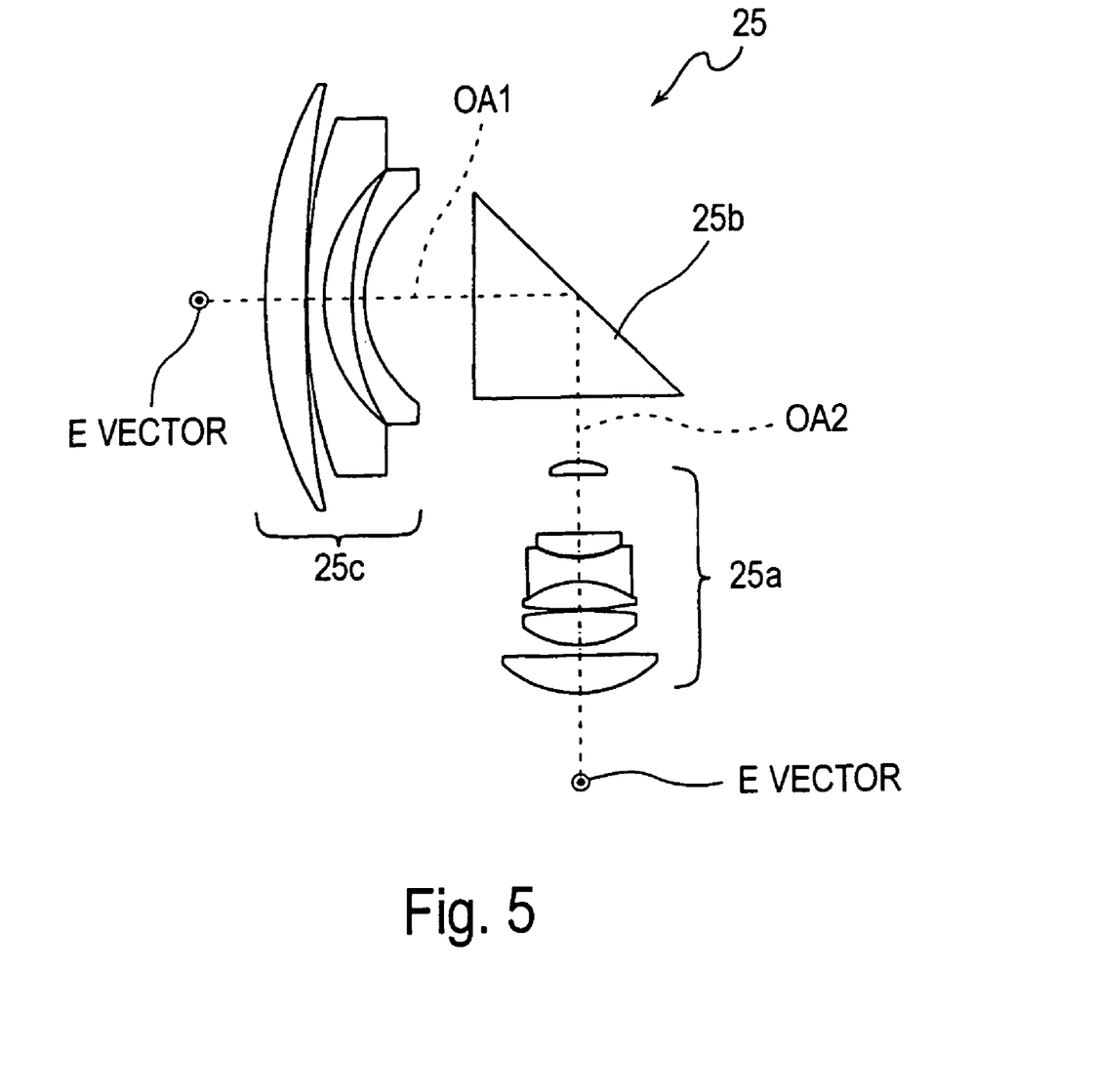
FIG. 5 is a schematic illustrating the structure of a projection optical system.

FIG. 4 is an elevation view illustrating the structure of the optical system portion including the illumination device 21, the color-separation modulation optical-system 23 and the projection optical system 25. FIG. 5 is a side view illustrating the structure of the projection optical system 25.

The illumination device 21 includes a light source lamp 41, a first fly-eye lens 43, a second fly-eye lens 45, a polarization-conversing member 47, and a superimposing lens 49. Here, an example of the light source lamp 41 is a high-pressure mercury-vapor lamp including a concave mirror for collimating source light. Also, the first fly-eye lens 43, having a plurality of element lenses arranged in a matrix pattern, divides the source light emitted from the light source lamp 41 and separately collects it with these element lenses.

The second fly-eye lens 45, also having a plurality of element lenses arranged in a matrix pattern, forms uniform divergent light from secondary light sources formed with the first fly-eye lens 43 and emits uniform illumination light to be superimposed on light valves (spatial light modulation devices), which will be described later, with these element lenses. The polarization-conversing member 47 converts the illumination light emitted from the second fly-eye lens 45 into only a polarized component orthogonal to the plane of FIG. 4 and supplies it to the following optical system. The superimposing lens 49 converges the illumination light passing through the polarization-conversing member 47 if needed so that the light valves in the color-separation modulation optical-system 23 can perform superimposing illumination. An optical axis OA3 of the illumination device 21 extends horizontally, and resultantly, the light axis of the light source lamp 41 also extends horizontally. As a result, the light source lamp 41 lies horizontally, whereby stable light emission can be achieved by maintaining an operating temperature and the like of the light source lamp 41 in a stable state and also the life span of the light source lamp 41 can be extended.

The color-separation modulation optical-system 23, serving as a light-separation modulation device, includes first and second dichroic mirrors 51 and 52, three field lenses 53a to 53c, three light valves 54a to 54c, a cross dichroic prism 55, three pairs of polarization filters 56a to 56c arranged so as to sandwich the corresponding light valves 54a to 54c. Among them, the light valves 54a to 54c and the polarization filters 56a to 56c form a color modulation device. Blue light (B light) reflected at the first dichroic mirror 51 is reflected at a reflecting mirror M1, passes through the field lens 53a, and is incident on the light valve 54a sandwiched between the pair of polarization filters 56a. Green light (G light), transmitted through the first dichroic mirror 51 and reflected at the second dichroic mirror 52, passes through the field lens 53b and is incident on the light valve 54b sandwiched between the pair of polarization filters 56b. Red light (R light), transmitted through the first and second dichroic mirrors 51 and 52, passes through a relay lens R1, is reflected at a reflecting mirror M2, passes through a relay lens R2, is reflected at a reflecting mirror M3, passes through the field lens 53c and is then incident on the light valve 54c sandwiched between the pair of polarization filters 56c. Each of the light valves 54a to 54c serve as a spatial light modulation device to modulate the corresponding spatial intensity distribution of illumination light incident thereon. The three kinds of color light, incident on the corresponding light valves 54a to 54c, are respectively modulated thereby, are synthesized with the cross dichroic prism 55 serving as a light-synthesizing member and are then emitted from a side surface thereof. The synthesized light, emitted from the cross dichroic prism 55, is incident on the projection optical system 25.

The projection optical system 25 is formed by a front first lens group 25a, a prism mirror 25b to bend a light path and a rear second lens group 25c. Here, the first lens group 25a is composed of six concave and convex lens elements. Also, the second lens group 25c is composed of three meniscus lens elements. The prism mirror 25b, sandwiched between the two lens groups 25a and 25c, serves as a reflecting device so as to bend a vertical light path by 90 degrees into a horizontal light path. The exit-side optical axis OA1 and the incident-side optical axis OA2 of the projection optical system 25 are perpendicular to each other on the reflective surface of the prism mirror 25b.

An operation of the projector according to the exemplary embodiment shown in FIGS. 1 to 5 will be described. The illumination device 21 serves as a white light source generating the three kinds of R, G, and B light. Illumination light, emitted from the illumination device 21, undergoes color separation with the dichroic mirrors 51 and 52 disposed in the color-separation modulation optical-system 23 and the three kinds of separated color light are incident on the corresponding light valves 54a to 54c. Each of the light valves 54a to 54c, modulated in accordance with an external image signal, has a two-dimensional refractive-index distribution and modulates the illumination light incident thereon. The three kinds of illumination light, that is, image light modulated with the light valves 54a to 54c, as mentioned above, are synthesized with the cross dichroic prism 55 and the synthesized image light is incident on the projection optical system 25. The image light, incident on the projection optical system 25, is incident on the screen 14 so as to serve as linearly polarized light having a polarization direction along the longitudinal direction of the screen 14. In this case, the polarization direction of projection light is set in the longitudinal direction of the screen 14, thereby achieving high luminance of an image projected onto the screen 14 while maintaining its uniformity of brightness.

Figure 6:
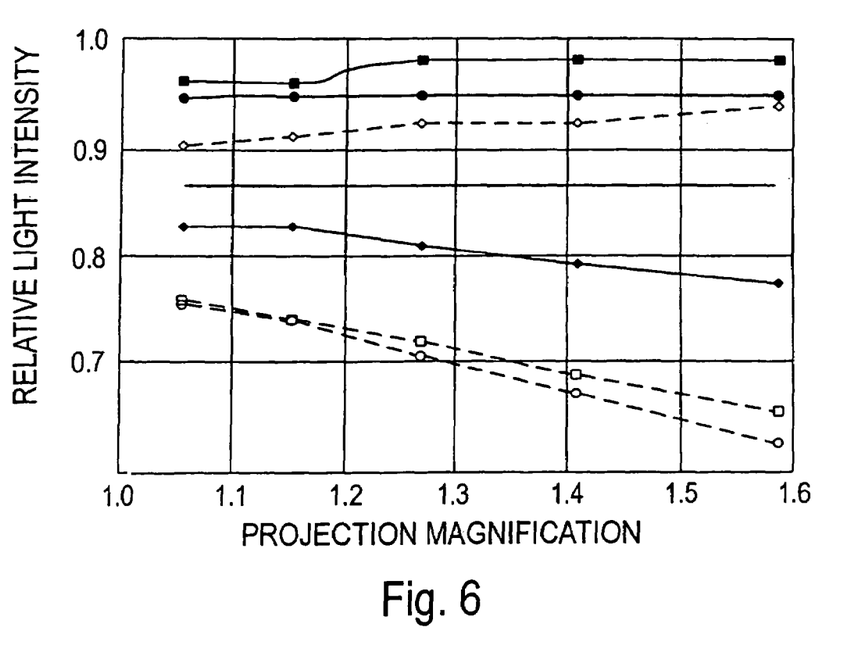
FIG. 6 is a graph illustrating light extinction due to the screen.
Figure 7:
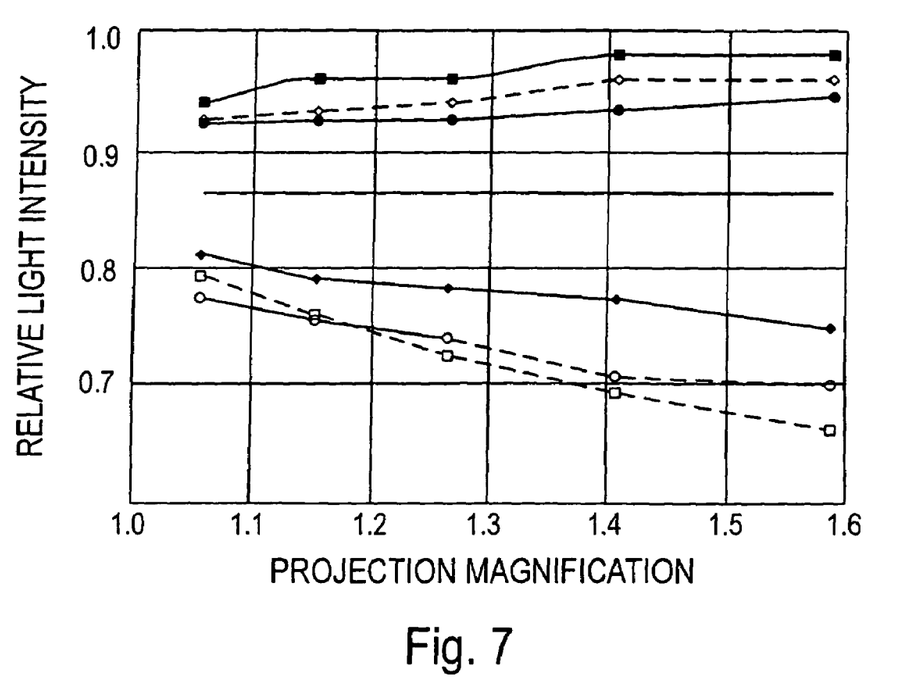
FIG. 7 is a graph illustrating light extinction due to another screen.

Each of FIGS. 6 and 7 is a graph illustrating, by simulation, the relationship between polarization direction of image light. Specifically, the projection light PL incident on the screen 14 disposed in the projector 10 shown in FIG. 1 and the other related figures and relative light intensity, that is, light extinction rate of an image light when passing through the screen 14. In these graphs, the horizontal and vertical axes represent a projection magnification and a relative light intensity, respectively.

Here, the term "projection magnification" refers to the ratio H/WD, where H represents the diagonal length of the screen 14 and WD represents the projection distance from the projection optical system 25 to the screen 14, and the greater the projection magnification, the greater the divergent angle of image light becomes. Also, the term "relative light intensity" refers to the ratio of the quantity of light transmitted through the screen 14 to that of light incident on the same. As the relative light intensity, a transmittance is computed in accordance with the Fresnel reflection formula, taking an incident angle and a perpendicularly polarized component of the image light incident on the screen 14 as parameters. The graphs shown in FIGS. 6 and 7 respectively correspond to the cases of using the screen 14 having an aspect ratio of 9 to 16, that is, having long width relative to the length, and the screen 14 having an aspect ratio of 3 to 4.

Figure 8:
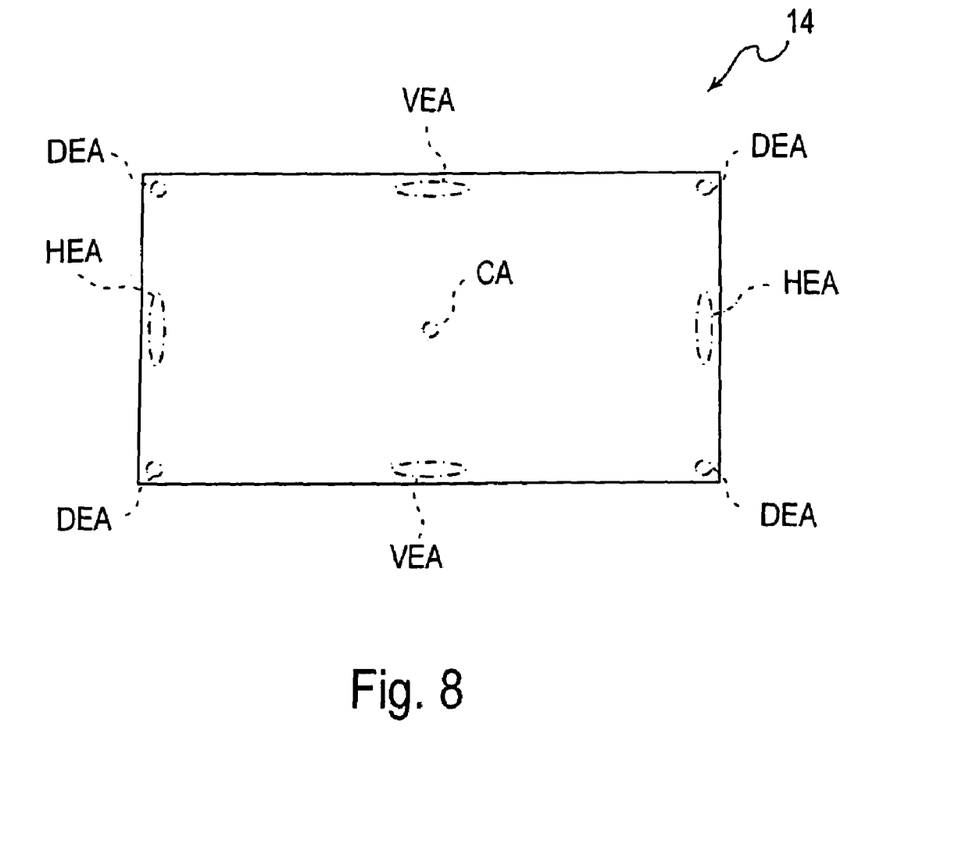
FIG. 8 is an illustration of areas on the screen.

FIG. 8 illustrates areas on the screen 14, the relative light intensities of which are compared to each other between FIGS. 6 and 7. The center, each of the right and left ends, each of the upper and lower ends, and each of the corners of the screen 14 are respectively defined as a central area CA, a horizontal end area HEA, a vertical end area VEA, and a diagonal end area DEA. With reference to these areas, marks shown in FIGS. 6 and 7 will be described. Each of the solid and open square marks represents a light extinction rate of linearly polarized light incident on the horizontal end areas HEA, each of the solid and open round marks represents a light extinction rate of linearly polarized light incident on the diagonal end areas DEA, and each of the solid and open diamond marks represents a light extinction rate of linearly polarized light incident on the vertical end areas HEA. Each of the straight lines in FIGS. 6 and 7, which exhibits a relative light intensity of about 0.87 and does not vary, represents a light extinction rate of linearly polarized light incident on the central area CA.

Also, each of the solid square, round, and diamond marks represents a light extinction rate in the case where image light incident on the screen 14 is linearly polarized light polarized in the longitudinal direction, that is, in the horizontal direction, corresponding to the polarization direction of the image light in the projector according to the present exemplary embodiment. Each of the open square, round, and diamond marks represents a light extinction rate in the case where image light incident on the screen 14 is linearly polarized light polarized in the lateral direction, that is, in the vertical direction, corresponding to the polarization direction of the image light in a comparative example projector.

As shown in both graphs, in the horizontal end areas HEA and the diagonal end areas DEA, a reflection loss of polarized light in the horizontal direction due to the screen 14 is less than that in the vertical direction The reflection loss of polarized light in the vertical direction due to the screen 14 is very large. Also, in the vertical end areas VEA, a reflection loss of polarized light in the vertical direction due to the screen 14 is less than that in the horizontal direction. Even in the case of polarized light in the horizontal direction, a loss due to the screen 14 does not increase so much. In summary, when the entire screen 14 is intended to be uniformly illuminated, by setting the polarization direction of image light in the longitudinal direction of the screen 14, the image light is unlikely to suffer from bias in accordance with the Fresnel reflection formula. Although a transmittance in the vertical end areas VEA is somewhat sacrificed, transmittances in the horizontal end areas HEA and the diagonal end areas DEA become relatively higher, whereby projection light having a uniform distribution as a whole is incident on the screen.

In addition, this phenomenon becomes significant as the projection magnification becomes greater. Accordingly, in the projector 10 offering a greater projection magnification that is, in the projector 10 of a direct projection type in which no mirror to bend a light path is disposed between the projection optical system 25 and the screen 14, it is very important to convert image light into polarized light in the horizontal direction as in the present exemplary embodiment from the viewpoint of achieving uniform illumination of the screen 14. Also, the above arrangement is very important to achieve a magnified size of the screen and a thin structure of the projector at the same time.

Although the present invention has been described according to an exemplary embodiment, it is not limited to the foregoing exemplary embodiment. For example, when the screen 14 has long length relative to the width, image light to be incident on the screen 14 is converted into linearly polarized light in the vertical direction, that is, as in its longitudinal direction.

Also, image light to be incident on the screen 14 can be converted into linearly polarized light not only in its longitudinal direction but also in its diagonal direction. In other words, linearly polarized light in the lateral direction of the screen 14 may be contained as long as it is not dominant.

In addition, a polarizing device to make linearly polarized light in a desired direction incident on the screen 14 is not limited to the three pairs of the polarization filters 56a to 56c, each pair sandwiching the corresponding light valves 54a to 54c. But it may be specially formed irrelevantly to the light valves 54a to 54c. In addition, the polarization filters 56a to 56c disposed on the exit sides of the corresponding light valves 54a to 54c may be single one commonly formed on the exit surface of the cross dichroic prism 55.

Furthermore, although the exit-side optical axis OA1 and the incident-side optical axis OA2 of the projection optical system 25 are perpendicular to each other in the foregoing exemplary embodiment, the degree of bend between the optical axes of the first lens group 25a and the second lens group 25c may be changed in accordance with the application and/or the purpose of the projector if needed.

Still furthermore, although the exit-side optical axis OA1 of the projection optical system 25 is orthogonal to the central part of the screen 14 in the foregoing exemplary embodiment, the optical axis OA1 may be slightly slanted with respect to a line perpendicular to the screen 14.

Moreover, although the screen 14 is formed by the transparent substrate 14a, the screen film 14b, and the Fresnel lens 14c in the foregoing exemplary embodiment, the screen is not limited to this structure and may have another optical element incorporated therein. In this case, by making divergent image light incident on a surface so as cause the polarization direction of the image light to agree with the longitudinal direction of the screen 14, the phenomenon of a reduced transmittance at longitudinal both ends of the screen can be reduced or prevented.

What is claimed is:

1. A projector, comprising:
  an illumination device to emit illumination light;
  a spatial light modulation device illuminated by the illumination light;
  a projection optical system to project image light emitted from the spatial light modulation devices;
  a flat and rectangular screen onto which the image light passing through the projection optical system is projected; and
  a polarization filter disposed between the spatial light modulation device and the screen, the polarization filter selects a substantially fixed polarization azimuth of a light emitted from the spatial modulation device to make the image light a linearly polarized light, the image light is projected on the screen as the linearly polarized light having the polarization azimuth along a predetermined direction except for a short direction of the screen.

2. The projector according to claim 1, the polarization filter making the image light emitted from the spatial light modulation device incident on the screen so as to serve as linearly polarized light having a polarization azimuth along the longitudinal direction of the screen.

3. The projector according to claim 1, the screen being a rear projection screen including a Fresnel lens portion disposed at the incident side thereof and a diffusing screen portion disposed at the exit side thereof.

4. The projector according to claim 1, the projection optical system including an L-shaped optical unit to bend a light path, including a pair of lens groups and reflecting device interposed therebetween.

5. The projector according to claim 1, an exit-side optical axis of the projection optical system being orthogonalized to a surface of the screen extending along the central part of the screen.

6. The projector according to claim 1, further comprising:
  a color modulation device including spatial light modulation devices for corresponding colors, each device being illuminated with corresponding illumination light emitted from the illumination device; and
  a light-separation modulation device which includes a light-synthesizing member to synthesize corresponding kinds of color image light emitted from the color modulation device and which emits the synthesized image light,
  the projection optical system projecting the image synthesized with the light-synthesizing member onto the screen.

* * * * *